United States Patent

[11] 3,608,842

[72] Inventor Anthony R. Engler
 Houston, Tex.
[21] Appl. No. 819,003
[22] Filed Apr. 24, 1969
[45] Patented Sept. 28, 1971
[73] Assignee Engler Manufacturing Corporation
 Houston, Tex.

[54] FLAIL-MOUNTING DEVICE
 15 Claims, 7 Drawing Figs.
[52] U.S. Cl. ..................................... 241/194,
 56/294
[51] Int. Cl. ..................................... B02c 18/18,
 A01d 55/22
[50] Field of Search .......................... 241/193,
 194, 195; 146/117; 56/294, 295

[56] References Cited
UNITED STATES PATENTS
2,460,279 2/1949 Ehmann ..................... 241/194

Primary Examiner—Robert C. Riordon
Assistant Examiner—Gary L. Smith
Attorneys—Murray Robinson and Ned L. Conley ABSTRACT: Means for individually mounting and dismounting flail cutting members from a rotor, wherein such means may include apertured positioners fixed to the rotor, rotatable blade holder rod contained within the positioners and having link-receiving portions, and link means connecting the flail cutting blades to the blade holder rod which link means may be so positioned relative to said rod as to permit individual blades or cutting members to be removed or attached.

PATENTED SEP 28 1971 3,608,842
SHEET 1 OF 2
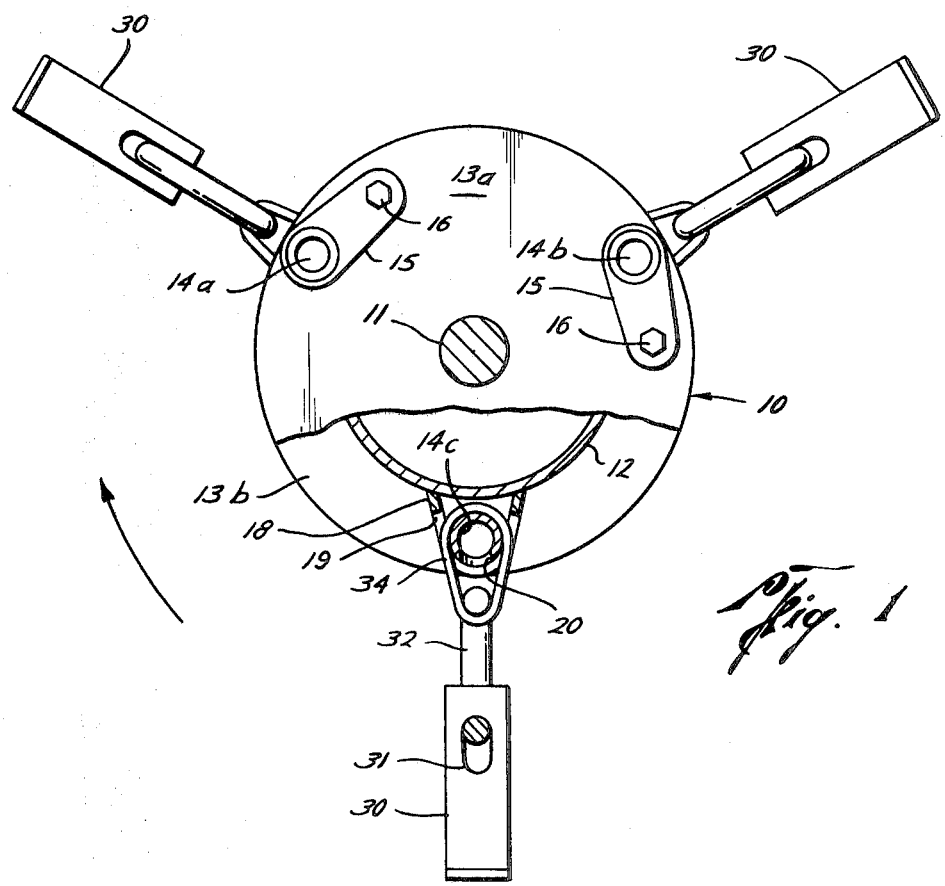
Fig. 1
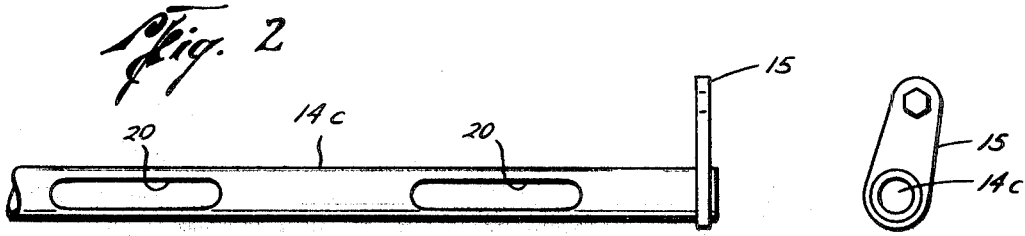
Fig. 2
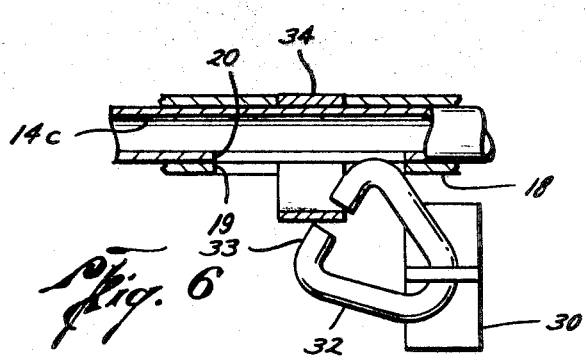
Fig. 6
Fig. 3
Anthony R. Engler
INVENTOR.
BY
ATTORNEY

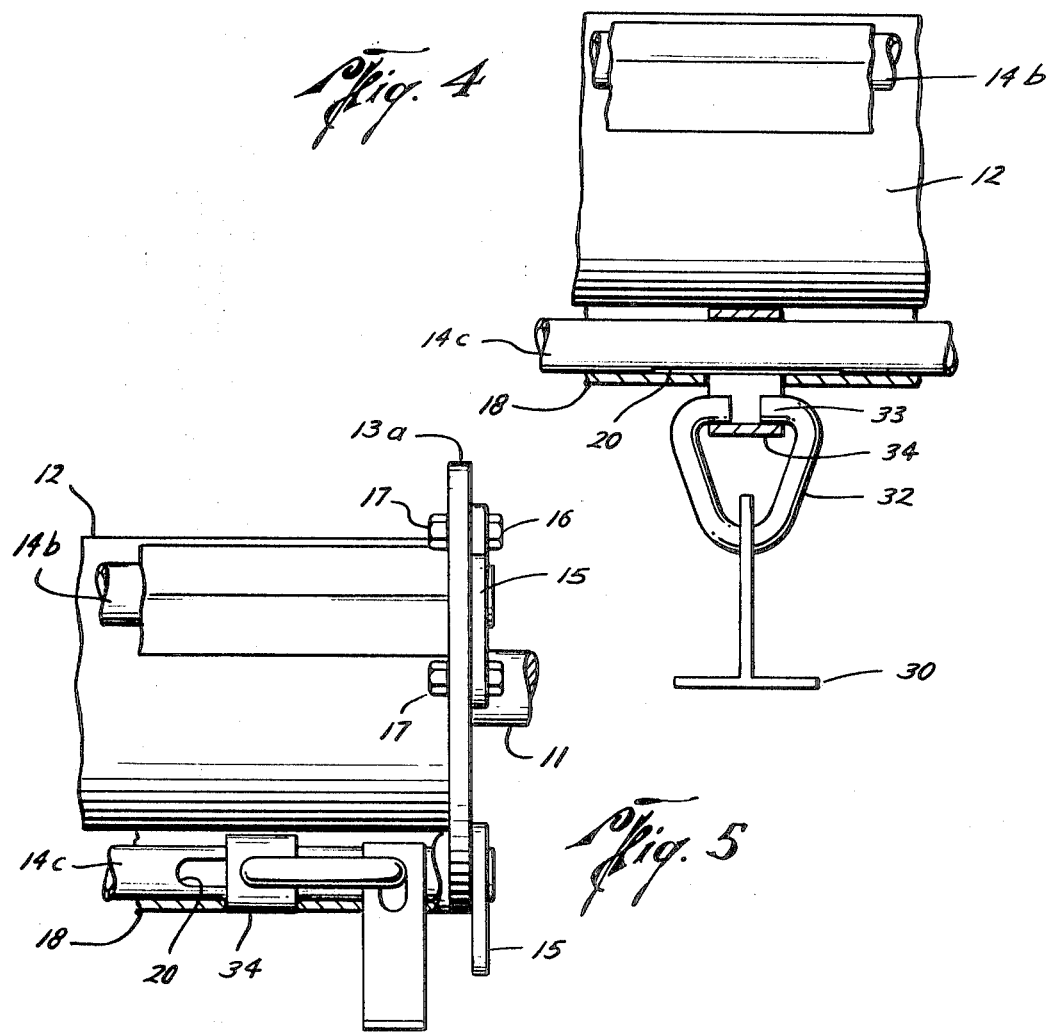
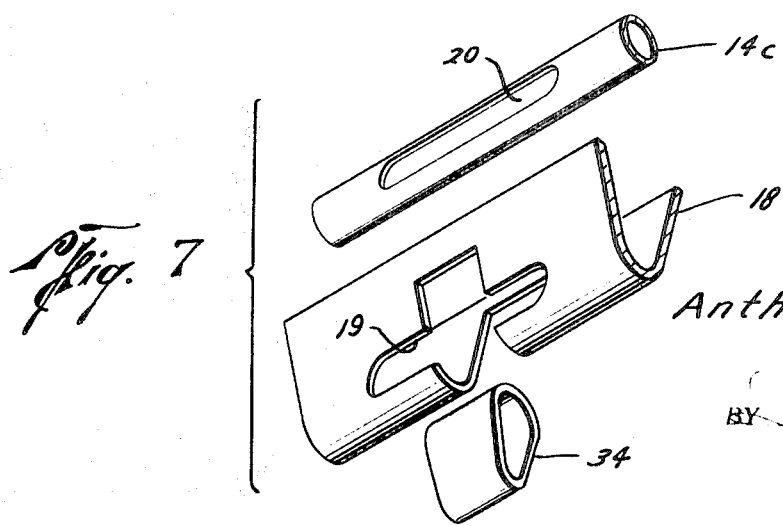

3,608,842

FLAIL-MOUNTING DEVICE

BACKGROUND OF THE INVENTION

Cutting devices of the flail type have long been used as mowers, harvesters, shredders or the like. Such devices generally include a central rotatable member, or rotor, extending generally parallel to the surface of the ground and transverse of the direction of the motion of the cutting device. Attached to the rotor in some manner are a number of individual cutting members, which have been called blades, flails cutting heads or the like. These blades are normally scattered or positioned on the rotor so as to overlap or to extend the cutting swath through substantially the entire rotor length. A particular problem that has been generated by the use of the large number of blades or flails on a rotor evolves around time necessary to assemble and/or disassemble the rotor and flails. Some prior arrangements have used individually positionable blades. More advanced devices have utilized rows of blades and holders therefor. While this latter feature represented a decided improvement in terms of operation, economy and effectiveness, the necessity of assembling or removing an entire horizontal row of flails or blades caused an excess of time to be expended when a single flail or limited numbers thereof needed to be examined or replaced, as for example when damaged during operation. It was to this combination of problems that this invention was directed, namely the ease and effectiveness of positioning rows or gangs of individual flails on a rotor, coupled with an advantageous manner of so mounting the flails as to permit them to be individually replaced.

DESCRIPTION OF THE DRAWINGS

FIG. 1 is an end view, partly in section, of the assembled rotor;

FIG. 2 is an elevation of one of the blade holder rods;

FIG. 3 is an elevation of the locking plate;

FIG. 4 is an axial section through the blade holder rod and positioner assembly, while in the operative position;

FIG. 5 is like FIG. 4, but in position for blade removal;

FIG. 6 is a sectionalized detail depicting the blade being affixed to the blade holder rod; and FIG. 7 is an exploded isometric of the rod positioner and band.

DESCRIPTION OF A PREFERRED EMBODIMENT

Normally, in a mower or similar machine using flails for cutting purposes, a rotatable shaft will be mounted in bearings borne by the mower housing. Such housing is not shown in the drawings, in that only the rotor is of consequence to this invention.

The rotor, indicated generally at 10, includes rotor shaft 11, which would extend transversely of the mower housing, and with its ends mounted in bearings (not shown) provided therein. Associated with the rotor shaft are rotary drum 12 and end plates $13_a$ and $13_b$ positioned near opposite ends of shaft 11. Such end plates may be affixed to the shaft and concentric drum, so as to rotate as a unit, in any number of conventional manners. For example, the shaft may be keyed to the end plates or welded thereto, while the drum may be welded to the end plates or linked thereto by intermediate annular discs. In any case a relatively unitary cylinder is formed (actually more spoollike in configuration) rotatable as a unit.

A plurality of blade holder rods, in this instance members $14_a$, $14_b$ and $14_c$, are rotatably linked to each of the end plates and pass just outside the confines of drum 12. The means of attaching such rods to the end plates may include affixing, as by welding, such rod ends to an apertured portion of locking plate 15. Apertures would be provided in the end plates for passage therethrough by such rods. Each of the locking plates 15 may be releasably fixed to their respective end plate 13 by virtue of pins or bolts, such as members 16, passing through aligned apertures, with nuts 17 provided which may be loosened for permitting such rotation. Thus, it will be understood that on removing connectors 16, 17, the locking plates 15 may be individually pivoted about their connection with their respective rods 14, thereby rotating such rods as the locking plates pivot.

Arcuately spaced about the exterior of drum 12, and affixed thereto so as to substantially encircle rods 14, are generally triangularly configured positioners such as 18. There would be one of such positioners for each of such rods, and the positioners may extend for substantially the width of the drum. Spaced along the length of the positioners are cutout portions 19, there being such a portion in the area of each attached cutter blade, such cutout permitting communication from its exterior to its hollow interior. Likewise, each of the blade holder rods has spaced therealong a plurality of narrower, axially extended slots 20, therethrough. In the operative or cutting position of FIG. 4, the slots through members 14 and 18 would not be aligned. On proper rotation of rods 14, they may be so aligned.

Each cutting blade 30, or flail, may have a shank portion apertured at 31, to receive a clasp 32. Such a clasp may have inwardly directed tips 33 which define an opening therebetween. Encirclingly mounted about rods 14, and partially extending through openings 19 in positioners 18 are banklike links 34. Tops 33 of clasps 32 are also positioned within such links 34. Thus, cutter blades 30 may be positioned along the lengths of rods 14, as desired by the flexible linking assemblies formed by the cooperating clasps 32 an links 34.

Now, as previously mentioned, in the cutting position, the apertures of rods 14 and positioners 18 are not so aligned as to permit disengagement of the associate cutter blade and clasp. Assume now that it is desirable to remove an individual cutter blade assembly. Fastener members 16, 17 of the appropriate rod 14 may be removed. Locking plate 15 may then be pivoted (see the lowermost locking plate in FIG. 5) so as to rotate rod $14_c$ and place its slotted portion 20 in alignment with slot 19 of positioners 18. Link 34 may then be moved so as to permit alignment of tips 33 of clasp 32 with slots or apertures 19, 20. Thus, enough of clasp 32 may enter within the interior of hollow rod 14 to permit removal of clasp 32 from link 34, by virtue of the space intermediate clasp tips 33. Reinsertion of a cutter blade assembly would simply be a reversal of the procedure described above, culminated by rotation of locking plate 15 to a position wherein fasteners 16, 17 may be reaffixed so as to join such locking plate to end plate 13.

Although only a single embodiment has been described, it should be obvious that numerous modifications would be possible by one skilled in the art without departing from the spirit of the invention, the scope of which is intended to be limited only by the following claims.

I claim:

1. A flail-type cutting apparatus having a rotatable rotor portion, a plurality of cutting blades, and means for attaching such cutting blades to said rotor, the improvement comprising:
   a rod rotatable with respect to said rotor;
   means for linking said rod to individual ones of said cutting blades;
   means including a passageway through said rod for permitting release of said linking means from said rod and a releasable pivot for rotating said rod, said means permitting removal of individual ones of said cutting blades when said rod is in a first position relative to said rotor, and said means barring such removal when said rod is in a further position relative to said rotor.

2. A flail-type cutting apparatus having a rotatable rotor portion, a plurality of cutting blades, and means for attaching said cutting blades to said rotor, the improvement comprising:
   a rod rotatable with respect to said rotor;
   means for linking said rod to individual ones of said cutting blades, said linking means including a link encircling said rod, and a clasp joining a cutter blade to said link; and means for permitting removal of individual ones of said cutting blades, said means including a rod positioning means joined to said rotor, alignable passageway means through said rod positioning means and said rod for permitting release of said linking means from said rod, said removal means including two positions, a first position allowing the removal of said cutting blades from said rotor and a second position barring such removal when said rod is in a further position relative to said rotor.

3. A flail-type cutting apparatus comprising:
a flail loosely and removable mounted on a flexible linking assembly,
a rod movable from a releasing position to another position, said linking assembly being mounted on said rod,
means for securing said rod from movement from said other position to said releasing position,
means on said rod preventing disassembly of said linking assembly when said rod is not in the releasing position, and
means on said rod allowing disassembly of said linking assembly when said rod is in the releasing position.

4. A flail-type cutting apparatus as defined by claim 3 wherein said linking assembly comprises:
a link encircling said rod, and
a clasp linked in said link, said clasp having a gap therein through which the link will pass upon rotation of said clasp, wherein the means on said rod comprise means to prevent rotation of said clasp when the rod is not in the releasing position and to allow rotation of said clasp when the rod is in the releasing position.

5. A flail-type cutting apparatus comprising:
a flail loosely and removably mounted on a flexible linking assembly,
a rod rotatable from a releasing position to another position, said linking assembly being mounted on said rod,
means for securing said rod against rotation from said other position to said releasing position,
means on said rod preventing disassembly of said linking assembly when said rod is not in the releasing position, and
means on said rod allowing disassembly of said linking assembly when said rod is in the releasing position.

6. A flail-type cutting apparatus as defined by claim 5 wherein said linking assembly comprises:
a link encircling said rod, and
a clasp linked in said link, said clasp having a gap therein through which the link will pass upon rotation of said clasp, wherein the means on said rod comprise means to prevent rotation of said clasp when the rod is not in the releasing position and to allow rotation of said clasp when the rod is in the releasing position.

7. A flail-type cutting apparatus comprising:
a rotatable rotor portion,
a rod rotatable with respect to said rotor portion,
a flail,
a link assembly connecting said rod with said flail,
means for rotating said rod to a releasing position and to another position, and
means for disassembly of said link assembly, said means disposed on said rotor portion, said means allowing disassembly when said rod is rotated to the releasing position, and said means barring such disassembly when said rod is rotated to another position.

8. A flail-type cutting apparatus characterized in claim 7 wherein said means for disassembly of said link assembly comprise:
means forming a passageway affixed to said rotor portion, said means having a slot, and
said rod passing trough said passageway, having a recess alignable with said slot.

9. A flail-type cutting apparatus characterized in claim 8 wherein said releasing position includes the alignment of the recess and the slot.

10. A flail-type cutting apparatus characterized in claim 8 wherein said link assembly includes:

a link connected to said rod, having such dimensions as to be loosely received within the slot,
a clasp having a side whose length is at least equal to the width of the link, said side including a gap intermediate its ends, and said side terminating in corners which are dimensioned so that they will not pass between the link and the rod when the recess and slot are not aligned, but will pass therebetween when the recess and the slot are aligned.

11. A flail-type cutting apparatus comprising:
a rotatable drum,
means forming a passageway affixed to said drum, said means having a slot,
a rod passing through said passageway, having a recess alignable with the slot, said rod adapted to be rotated to a releasing position and to another position,
a linking assembly loosely received within the slot, engaged with said rod, having a portion movable within said slot and recess when the rod is in the releasing position, and prevented from moving within the slot and recess when the rod is in another position thereby barring disengagement, and
a flail attached to said linking assembly.

12. A flail-type cutting apparatus comprising:
a drum rotatably mounted on a shaft positioned through its center,
a positioner affixed to the external surface of said drum forming a passageway extending longitudinally of the drum, said positioner having a slot,
a rod through the passageway, said rod having a recess alignable with said axial slot,
means for rotating the rod to align the recess and the axial slot,
a link loosely received within the slot and circumscribing said rod,
a clasp having a side with a gap therein, whereby the clasp and the link are secured when the slot and the recess are misaligned and are releasable when the slot and the recess are aligned, and
a flail attached to said clasp.

13. A flail-type cutting apparatus comprising:
a spoollike drum rotatably mounted on a shaft positioned through its center,
a positioner affixed to the external surface of said drum forming a passageway extending longitudinally of the drum, having an axial slot and a radial slot perpendicularly intersecting said axial slot,
a rod through the passageway, having a recess alignable with said axial slot,
means for rotating the rod to align the recess and the axial slot,
a link loosely received within the radial slot, circumscribing the rod, having a limited rotation around the rod and within the radial slot,
a clasp linked in the link having a side with a gap therein whereby the clasp and link are secured together either when the link and axial slot are not coaxial or the axial slot and the recess are misaligned, and whereby the clasp and link are releaseable when the link and axial slot are coaxial and the axial slot and recess are aligned, and a flail attached to said clasp.

14. A flail-type cutting apparatus characterized by claim 13 wherein said radial slot in said positioner is disposed on the outermost surface of the positioner from the axis of the drum.

15. In a flail-type cutting apparatus comprising a rotary drum including a first circular end plate affixed to on end of a cylinder, and a second circular end plate affixed to the other end of the cylinder, both circular end plates having an equal diameter larger than the diameter of the cylinder, and a shaft extending axially through the drum, and rotatably mounted in bearings borne by the housing of the cutting apparatus,
the improvement comprising:

an elongated positioner with a V-shaped cross section extending longitudinally of the drum from one end plate to the other, and having its longitudinal edges affixed to the external surface of the drum to form a generally triangular passageway therethrough, said positioner having axially extending slots spaced along the length of said positioner, and said positioner having a radial slot perpendicularly intersecting each axially extending slot, said radial slot being disposed on the outermost surface of said positioner from the axis of said drum, a rod passing through the triangular passageway formed by the positioner and drum, and rotatably mounted in the end plates, said rod having recesses spaced along its length which are alignable with the axially extending slots of the positioner, a locking plate disposed on the external surface of one end plate and attached to the protruding end of the rod, said locking plate being adapted upon rotation thereof to rotate the rod to a releasing position whereby the axially extending slots of the positioner and the recesses of the rod are in alignment, and to another position whereby the axially extending slots of the positioner do not align with the recesses of the rod, a triangularly shaped link encircling said rod, and with such dimensions so as to be loosely received within a radial slot of the positioner, A clasp including a triangularly shaped rod having a side whose length is at least equal to the width of said link, said side including a gap intermediate its ends, said side terminating in corners which are dimensional so that they will not pass between said link and said rod when the axial slot and recess are not aligned, but will pass therebetween when the recess and axial slot are aligned, said gap having a greater width than the thickness of said link whereby the link can slide through the gap thereby attaching the link to the clasp, said link having such inner dimensions as to encircle both said rod and one side of said clasp, a flail having a shank with an aperture therein of larger diameter than the diameter of the rod of the clasp, and a thickness smaller than the gap in the clasp such that the shank of the flail will slide into the gap of the clasp and the rod of the clasp can then be threaded through the aperture thereby attaching the flail to the clasp, whereby the rotation of the locking plate to the releasing position and the rotation of the link within the radial slot to a position where the link and axial slot are coaxial, allows the clasp to be rotated into the aligned slot formed by the axial slot and recess thereby allowing disassembly of the clasp from the link, and whereby the rotation of the locking plate to another position or the rotation of the link such that the link and axial slot are not coaxial, prevents the rotation of the clasp thereby securing the clasp to the link and resulting in the attachment of the flail to the cutting apparatus.